(12) United States Patent
Hatano et al.

(10) Patent No.: US 12,247,593 B2
(45) Date of Patent: Mar. 11, 2025

(54) SOLENOID VALVE MANIFOLD

(71) Applicant: CKD Corporation, Komaki (JP)

(72) Inventors: Hisashi Hatano, Komaki (JP); Mitsuhiro Kosugi, Komaki (JP); Yasuhiko Kotera, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 18/549,262

(22) PCT Filed: Feb. 8, 2023

(86) PCT No.: PCT/JP2023/004256
§ 371 (c)(1),
(2) Date: Sep. 6, 2023

(87) PCT Pub. No.: WO2023/162691
PCT Pub. Date: Aug. 31, 2023

(65) Prior Publication Data
US 2024/0151248 A1 May 9, 2024

(30) Foreign Application Priority Data
Feb. 24, 2022 (JP) ................. 2022-026357

(51) Int. Cl.
*F15B 13/08* (2006.01)
*F16K 31/42* (2006.01)
*F16K 11/07* (2006.01)

(52) U.S. Cl.
CPC ...... *F15B 13/0857* (2013.01); *F15B 13/0807* (2013.01); *F15B 13/0853* (2013.01); *F16K 11/07* (2013.01); *F16K 31/426* (2013.01)

(58) Field of Classification Search
CPC ...... F16K 11/07; F16K 31/426; F16K 31/423; F15B 13/0857
See application file for complete search history.

(56) References Cited

U.S. PATENT DOCUMENTS 5,704,399 A * 1/1998 Hayashi ............. F15B 13/0857
137/271
6,913,037 B2 * 7/2005 Miyazoe ............. F15B 13/0817
137/557

(Continued)

FOREIGN PATENT DOCUMENTS

JP 2020-186781 A 11/2020

OTHER PUBLICATIONS

International Search Report (Chinese and English) and Written Opinion for International Application No. PCT/JP2023/004256, dated Apr. 18, 2023, 8 pages.

*Primary Examiner* — Michael R Reid
(74) *Attorney, Agent, or Firm* — Tarolli, Sundheim, Covell & Tummino LLP

(57) ABSTRACT

A solenoid valve manifold (10) includes a connector member (70) that is formed by integrating a base portion (71) with a first connector portion (80) configured to electrically connect a first conductive member (52) to a circuit board (41) and a second connector portion (90) configured to electrically connect a second conductive member (62) to the circuit board (41). The base portion (71) has a through-hole (72). The base (30) includes two engagement projections (46). The base portion (71) is elastically deformable in a direction intersecting an insertion direction when the two engagement projections (46) are inserted into the through-hole (72). The connector member (70) is configured to be attached to the base (30) when a part of the base portion (71) around the through-hole (72) is engaged with the two engagement projections (46).

3 Claims, 4 Drawing Sheets

(56) References Cited

U.S. PATENT DOCUMENTS

| | | | |
|---|---|---|---|
| 8,651,140 B2* | 2/2014 | Bogdanowicz | F15B 13/0875 137/884 |
| 11,549,608 B2* | 1/2023 | Hayashi | F16K 27/003 |
| 2021/0324966 A1 | 10/2021 | Hayashi et al. | |

* cited by examiner

SOLENOID VALVE MANIFOLD

CROSS-REFERENCE TO RELATED APPLICATIONS

This application is a U.S. National Stage Application filed under 35 U.S.C. § 371 of PCT/JP2023/004256, filed Feb. 8, 2023, and entitled "SOLENOID VALVE MANIFOLD", which claims priority from Japanese Patent Application No. 2022-026357, filed on Feb. 24, 2022. The entire contents of each of the above-identified patent applications are incorporated herein by reference.

TECHNICAL FIELD

The present disclosure relates to a solenoid valve manifold.

BACKGROUND

For example, as disclosed in Patent Literature 1, a solenoid valve manifold may include a main valve portion, a first pilot solenoid valve, a second pilot solenoid valve, a control unit, and a base. The main valve portion has a first pilot pressure acting chamber and a second pilot pressure acting chamber. The main valve portion switches the connected ports when a pilot fluid is supplied to and discharged from each of the first pilot pressure acting chamber and the second pilot pressure acting chamber.

The first pilot solenoid valve and the second pilot solenoid valve are integrated with each other and arranged side by side. The first pilot solenoid valve includes a first solenoid portion. The first pilot solenoid valve supplies and discharges the pilot fluid to and from the first pilot pressure acting chamber. The second pilot solenoid valve includes a second solenoid portion. The second pilot solenoid valve supplies and discharges the pilot fluid to and from the second pilot pressure acting chamber. The first pilot solenoid valve includes a first conductive member. The first conductive member is electrically connected to the first solenoid portion. The second pilot solenoid valve includes a second conductive member. The second conductive member is electrically connected to the second solenoid portion.

The control unit includes a circuit board. The circuit board controls driving of each of the first pilot solenoid valve and the second pilot solenoid valve. The base includes the control unit. The base includes a first connector portion and a second connector portion. The first conductive member is inserted into and connected to the first connector portion, and the first connector portion electrically connects the first conductive member and the circuit board to each other. The second conductive member is inserted into and connected to the second connector portion, and the second connector portion electrically connects the second conductive member to the circuit board. The insertion direction of the first conductive member into the first connector portion is identical with the insertion direction of the second conductive member into the second connector portion.

CITATION LIST

Patent Literature

Patent Literature 1: Japanese Patent Application Laid-Open No. 2020-186781

SUMMARY OF INVENTION

Problems that the Invention is to Solve

In such a solenoid valve manifold, if the relative position between the first connector portion and the second connector portion is shifted from a predetermined position, it may be difficult to insert and connect the first conductive member and the second conductive member into the first connector portion and the second connector portion, respectively. Thus, it is desired that the first conductive member and the second conductive member be readily inserted into and connected to the first connector portion and the second connector portion, respectively, and the size of the solenoid valve manifold be reduced.

Solution to Problem

A solenoid valve manifold according to an aspect of the present disclosure includes a main valve portion including a first pilot pressure acting chamber and a second pilot pressure acting chamber, the main valve portion being configured to switch connected ports when a pilot fluid is supplied to and discharged from each of the first pilot pressure acting chamber and the second pilot pressure acting chamber, a first pilot solenoid valve including a first solenoid portion and configured to supply and discharge the pilot fluid to and from the first pilot pressure acting chamber, a second pilot solenoid valve including a second solenoid portion and configured to supply and discharge the pilot fluid to and from the second pilot pressure acting chamber, a control unit including a circuit board that is configured to control driving of the first pilot solenoid valve and the second pilot solenoid valve, and a base including the control unit. The first pilot solenoid valve and the second pilot solenoid valve are integrated with each other and arranged side by side. The first pilot solenoid valve includes a first conductive member electrically connected to the first solenoid portion. The second pilot solenoid valve includes a second conductive member electrically connected to the second solenoid portion. The base includes a first connector portion into which the first conductive member is inserted and connected, the first connector portion being configured to electrically connect the first conductive member to the circuit board, and a second connector portion into which the second conductive member is inserted and connected, the second connector portion being configured to electrically connect the second conductive member to the circuit board. An insertion direction of the first conductive member into the first connector portion is identical with an insertion direction of the second conductive member into the second connector portion. The solenoid valve manifold further comprises a connector member having a flat base portion, the first connector portion and the second connector portion being integrated with the base portion. The base portion has a through-hole extending through the base portion in a thickness direction. The base includes two engagement projections. The base portion is elastically deformable in a direction intersecting the insertion direction when the two engagement projections are inserted into the through-hole. The connector member is configured to be attached to the base when a part of the base portion around the through-hole is engaged with the two engagement projections.

MODES FOR CARRYING OUT THE INVENTION

An embodiment of a solenoid valve manifold will now be described with reference to FIGS. 1 to 6.

Solenoid Valve Manifold 10

Figure 1:
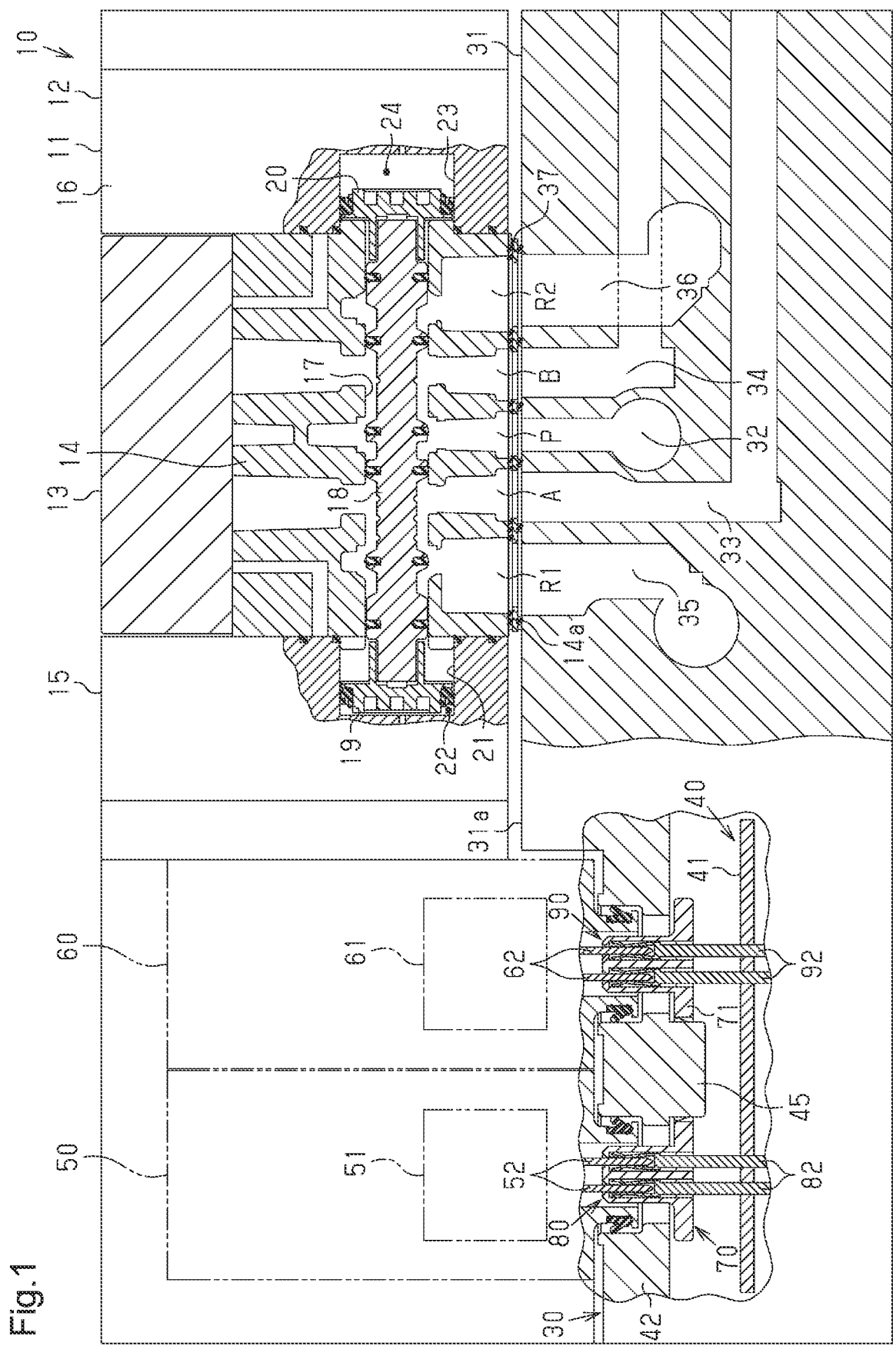
FIG. 1 is a cross-sectional view showing a solenoid valve manifold according to an embodiment.

As shown in FIG. 1, the solenoid valve manifold 10 includes a solenoid valve 11. The solenoid valve 11 includes a main valve portion 12, a first pilot solenoid valve 50, and a second pilot solenoid valve 60. Thus, the solenoid valve manifold 10 includes the main valve portion 12, the first pilot solenoid valve 50, and the second pilot solenoid valve 60. The solenoid valve 11 is a pilot solenoid valve of a double solenoid type. The solenoid valve manifold 10 includes a control unit 40 and a base 30.

Main Valve Portion 12

The main valve portion 12 includes a valve casing 13. The valve casing 13 has a rectangular block shape. The valve casing 13 includes a valve body 14, a first coupling block 15, and a second coupling block 16. The valve body 14 has a rectangular block shape. The first coupling block 15 is coupled to a first end of the valve body 14 in a longitudinal direction. The second coupling block 16 is coupled to a second end of the valve body 14 in the longitudinal direction. The valve body 14 includes a body facing surface 14a facing the base 30.

The valve casing 13 has a spool valve bore 17. The spool valve bore 17 is formed in the valve body 14. The spool valve bore 17 is circular. The spool valve bore 17 extends in the longitudinal direction of the valve body 14. A first end of the spool valve bore 17 opens in a first end face of the valve body 14 in the longitudinal direction. A second end of the spool valve bore 17 opens in a second end face of the valve body 14 in the longitudinal direction. Thus, the spool valve bore 17 extends through the valve body 14 in the longitudinal direction.

The solenoid valve 11 includes a spool valve 18. The spool valve 18 is accommodated in the spool valve bore 17. The spool valve 18 is accommodated in the spool valve bore 17 in a state in which the axial direction of the spool valve 18 coincides with the axial direction of the spool valve bore 17. The spool valve 18 is accommodated in the spool valve bore 17 so as to reciprocate therein.

The solenoid valve 11 has a supply port P, a first output port A, a second output port B, a first discharge port R1, and a second discharge port R2. Thus, the solenoid valve 11 of the present embodiment is a five-port solenoid valve. The supply port P, the first output port A, the second output port B, the first discharge port R1, and the second discharge port R2 are formed in the valve body 14. Each of the supply port P, the first output port A, the second output port B, the first discharge port R1, and the second discharge port R2 connect to the spool valve bore 17.

The first discharge port R1, the first output port A, the supply port P, the second output port B, and the second discharge port R2 are arranged in this order from the first end toward the second end of the valve body 14 in the longitudinal direction. A first end of each of the supply port P, the first output port A, the second output port B, the first discharge port R1, and the second discharge port R2 connects to the spool valve bore 17. A second end of each of the supply port P, the first output port A, the second output port B, the first discharge port R1, and the second discharge port R2 opens in the body facing surface 14a of the valve body 14.

The solenoid valve 11 includes a first piston 19 and a second piston 20. The first piston 19 has a disc shape. The first piston 19 is coupled to a first end of the spool valve 18. The first piston 19 moves integrally with the spool valve 18. The second piston 20 has a disc shape. The second piston 20 is coupled to a second end of the spool valve 18. The second piston 20 moves integrally with the spool valve 18.

The first coupling block 15 has a first piston accommodating recess 21 having a circular hole shape. The first piston 19 is accommodated in the first piston accommodating recess 21 so as to reciprocate therein. The first piston accommodating recess 21 and the first piston 19 define a first pilot pressure acting chamber 22. Thus, the main valve portion 12 includes the first pilot pressure acting chamber 22. A pilot fluid is supplied to and discharged from the first pilot pressure acting chamber 22.

The second coupling block 16 includes a second piston accommodating recess 23 having a circular hole shape. The second piston 20 is accommodated in the second piston accommodating recess 23 so as to reciprocate therein. The second piston accommodating recess 23 and the second piston 20 define a second pilot pressure acting chamber 24. Thus, the main valve portion 12 includes the second pilot pressure acting chamber 24. The pilot fluid is supplied to and discharged from the second pilot pressure acting chamber 24.

Base 30

The base 30 includes a manifold block 31. The manifold block 31 has a rectangular block shape. The manifold block 31 has a mount surface 31a. The solenoid valve 11 is mounted on the mount surface 31a. The longitudinal direction of the manifold block 31 coincides with the longitudinal direction of the valve casing 13.

The manifold block 31 includes a supply passage 32, a first output passage 33, a second output passage 34, a first discharge passage 35, and a second discharge passage 36. The supply passage 32, the first output passage 33, the second output passage 34, the first discharge passage 35, and the second discharge passage 36 open in the mount surface 31a.

The end of the supply passage 32 that opens in the mount surface 31a connects to the supply port P. The end of the first output passage 33 that opens in the mount surface 31a connects to the first output port A. The end of the second output passage 34 that opens in the mount surface 31a connects to the second output port B. The end of the first discharge passage 35 that opens in the mount surface 31a connects to the first discharge port R1. The end of the second discharge passage 36 that opens in the mount surface 31a connects to the second discharge port R2.

The end of the supply passage 32 on a side opposite to the mount surface 31a is connected to a fluid supply source (not shown) by, for example, a pipe or the like. The end of the first output passage 33 on the side opposite to the mount surface 31a and the end of the second output passage 34 on the side opposite to the mount surface 31a are connected to a fluid pressure device (not shown) by, for example, a pipe or the like. The end of the first discharge passage 35 on the side opposite to the mount surface 31a and the end of the second discharge passage 36 on the side opposite to the mount surface 31a are exposed to the atmosphere by, for example, a pipe or the like.

The solenoid valve manifold 10 includes an annular gasket 37. The gasket 37 has the form of, for example, a thin plate. The gasket 37 seals a section between the valve body 14 of the solenoid valve 11 and the manifold block 31.

Control Unit 40

The control unit 40 is built in the manifold block 31. Thus, the base 30 includes the control unit 40. The control unit 40 includes a circuit board 41. For example, the circuit board 41 is supplied with power from an external control device such as a programmable logic controller (PLC), which is not illustrated in the drawings. The circuit board 41 is built in the manifold block 31. The circuit board 41 controls driving of each of the first pilot solenoid valve 50 and the second pilot solenoid valve 60.

First Pilot Solenoid Valve 50

The first pilot solenoid valve 50 includes a first solenoid portion 51. The first pilot solenoid valve 50 supplies and discharges a pilot fluid to and from the first pilot pressure acting chamber 22. When a voltage is applied to the first solenoid portion 51 from the circuit board 41, the first pilot solenoid valve 50 supplies, to the first pilot pressure acting chamber 22 as the pilot fluid, a compressed fluid supplied from the fluid supply source (not shown). When the application of a voltage to the first solenoid portion 51 from the circuit board 41 is stopped, the first pilot solenoid valve 50 stops supplying, to the first pilot pressure acting chamber 22, the compressed fluid supplied from the fluid supply source. Then, the first pilot solenoid valve 50 discharges the pilot fluid from the first pilot pressure acting chamber 22 to the atmosphere.

Second Pilot Solenoid Valve 60

The second pilot solenoid valve 60 includes a second solenoid portion 61. The second pilot solenoid valve 60 supplies and discharges a pilot fluid to and from the second pilot pressure acting chamber 24. When a voltage is applied to the second solenoid portion 61 from the circuit board 41, the second pilot solenoid valve 60 supplies, to the second pilot pressure acting chamber 24 as the pilot fluid, a compressed fluid supplied from the fluid supply source. When the application of a voltage to the second solenoid portion 61 from the circuit board 41 is stopped, the second pilot solenoid valve 60 stops supplying, to the second pilot pressure acting chamber 24, the compressed fluid supplied from the fluid supply source. Then, the second pilot solenoid valve 60 discharges the pilot fluid from the second pilot pressure acting chamber 24 to the atmosphere.

The first pilot solenoid valve 50 and the second pilot solenoid valve 60 are integrated with each other and arranged side by side. Specifically, the first pilot solenoid valve 50 and the second pilot solenoid valve 60 are located on a side of the first coupling block 15 opposite to the valve body 14. The first pilot solenoid valve 50 and the second pilot solenoid valve 60 are arranged adjacent to the first coupling block 15.

First Position and Second Position of Spool Valve 18

The spool valve 18 is switchable between a first position and a second position. For example, it is assumed that a voltage is applied to the first solenoid portion 51 from the circuit board 41 and a voltage is not applied to the second solenoid portion 61 from the circuit board 41. Then, the compressed fluid supplied from the fluid supply source is supplied to the first pilot pressure acting chamber 22 as the pilot fluid by the first pilot solenoid valve 50. The pilot fluid in the second pilot pressure acting chamber 24 is discharged to the atmosphere by the second pilot solenoid valve 60. This moves the spool valve 18 toward the second piston accommodating recess 23. As a result, the spool valve 18 is switched to the first position at which the supply port P connects to the first output port A and the second output port B connects to the second discharge port R2. When the spool valve 18 is switched to the first position, the supply port P is disconnected from the second output port B and the first output port A is disconnected from the first discharge port R1.

For example, it is assumed that a voltage is not applied to the first solenoid portion 51 from the circuit board 41 and a voltage is applied to the second solenoid portion 61 from the circuit board 41. Then, the compressed fluid supplied from the fluid supply source is supplied to the second pilot pressure acting chamber 24 as the pilot fluid by the second pilot solenoid valve 60. The pilot fluid in the first pilot pressure acting chamber 22 is discharged to the atmosphere by the first pilot solenoid valve 50. This moves the spool valve 18 toward the first piston accommodating recess 21. As a result, the spool valve 18 is switched to the second position at which the supply port P connects to the second output port B and the first output port A connects to the first discharge port R1. When the spool valve 18 is switched to the second position, the supply port P is disconnected from the first output port A and the second output port B is disconnected from the second discharge port R2.

In this manner, the pilot fluid is supplied and discharged to and from the first pilot pressure acting chamber 22 by the first pilot solenoid valve 50, and the pilot fluid is supplied and discharged to and from the second pilot pressure acting chamber 24 by the second pilot solenoid valve 60. As a result, the spool valve 18 reciprocates in the spool valve bore 17 between the first position and the second position. When the spool valve 18 is switched between the first position and the second position, the connected ports are switched. Thus, the main valve portion 12 switches the connected ports when the pilot fluid is supplied to and discharged from each of the first pilot pressure acting chamber 22 and the second pilot pressure acting chamber 24. FIG. 1 shows a state in which the spool valve 18 is located at the second position.

First Conductive Member 52

Figure 2:
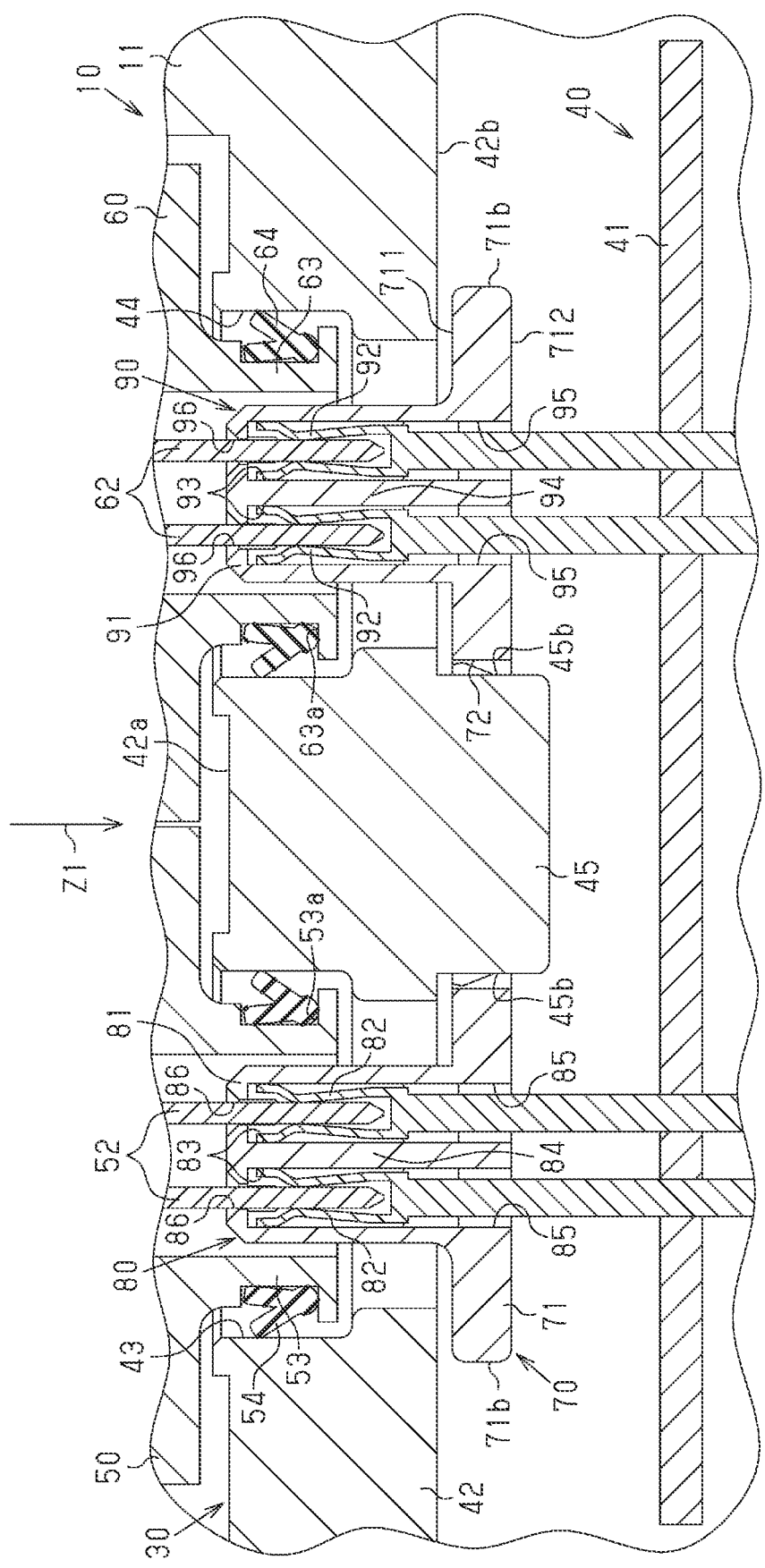
FIG. 2 is an enlarged cross-sectional view of a part of the solenoid valve manifold shown in FIG. 1.

As shown in FIG. 2, the first pilot solenoid valve 50 includes first conductive members 52. The first conductive members 52 are electrically connected to the first solenoid portion 51. The first pilot solenoid valve 50 includes two first conductive members 52. One of the two first conductive members 52 defines a positive electrode line, and the other one of the two first conductive members 52 defines a negative electrode line. Each first conductive member 52 is, for example, columnar.

First Tubular Portion 53

The first pilot solenoid valve 50 includes a first tubular portion 53. The first tubular portion 53 surrounds the two first conductive members 52. Specifically, the first tubular portion 53 surrounds the tips (ends) of the two first conductive members 52 on a side opposite to the first solenoid portion 51. The first tubular portion 53 is tubular. The tip of each first conductive member 52 protrudes outward from the first tubular portion 53 through the opening of the first tubular portion 53. The axial direction of the first tubular portion 53 is identical with the extending direction of the tip of each first conductive member 52. The first pilot solenoid valve 50 is disposed with respect to the base 30 such that the opening of the first tubular portion 53 opens toward the base 30. Thus, the tip of each first conductive member 52 extends toward the base 30.

The outer circumferential surface of the first tubular portion 53 has a first mount groove 53a. The first mount groove 53a is annular. A first lip packing 54 is mounted in the first mount groove 53a. The first lip packing 54 is made of rubber. The first lip packing 54 is annular.

Second Conductive Member 62

The second pilot solenoid valve 60 includes second conductive members 62. The second conductive members 62 are electrically connected to the second solenoid portion 61. The second pilot solenoid valve 60 includes two second conductive members 62. One of the two second conductive members 62 defines a positive electrode line, and the other one of the two second conductive members 62 defines a negative electrode line. Each second conductive member 62 is, for example, columnar.

Second Tubular Portion 63

The second pilot solenoid valve 60 includes a second tubular portion 63. The second tubular portion 63 surrounds the two second conductive members 62. Specifically, the second tubular portion 63 surrounds the tips (ends) of the two second conductive members 62 on a side opposite to the second solenoid portion 61. The second tubular portion 63 is tubular. The tip of each second conductive member 62 protrudes outward from the second tubular portion 63 through the opening of the second tubular portion 63. The axial direction of the second tubular portion 63 is identical with the extending direction of the tip of each second conductive member 62. The second pilot solenoid valve 60 is disposed with respect to the base 30 such that the opening of the second tubular portion 63 opens toward the base 30. Thus, the tip of each second conductive member 62 extends toward the base 30.

The axial direction of the second tubular portion 63 is identical with the axial direction of the first tubular portion 53. The extending direction of the tips of the second conductive members 62 is identical with the extending direction of the tips of the first conductive members 52.

The outer circumferential surface of the second tubular portion 63 has a second mount groove 63a. The second mount groove 63a is annular. A second lip packing 64 is mounted in the second mount groove 63a. The second lip packing 64 is made of rubber. The second lip packing 64 is annular.

Connector Member 70

The solenoid valve manifold 10 includes a connector member 70. The connector member 70 includes a base portion 71, a first connector portion 80, and a second connector portion 90. The connector member 70 is located on the base 30. Thus, the base 30 is provided with the first connector portion 80 and the second connector portion 90. The connector member 70 is formed by integrating the first connector portion 80 and the second connector portion 90 with the base portion 71.

Base Portion 71

Figure 3:
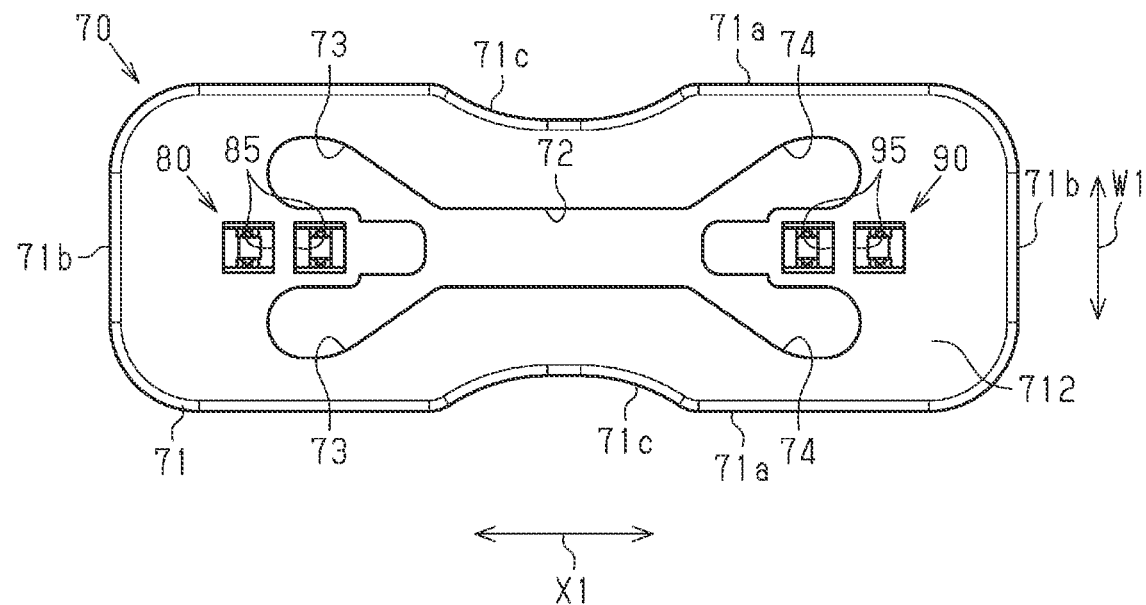
FIG. 3 is a plan view of the connector member included in the solenoid valve manifold shown in FIG. 2, as viewed from the second surface of the base portion.
Figure 4:
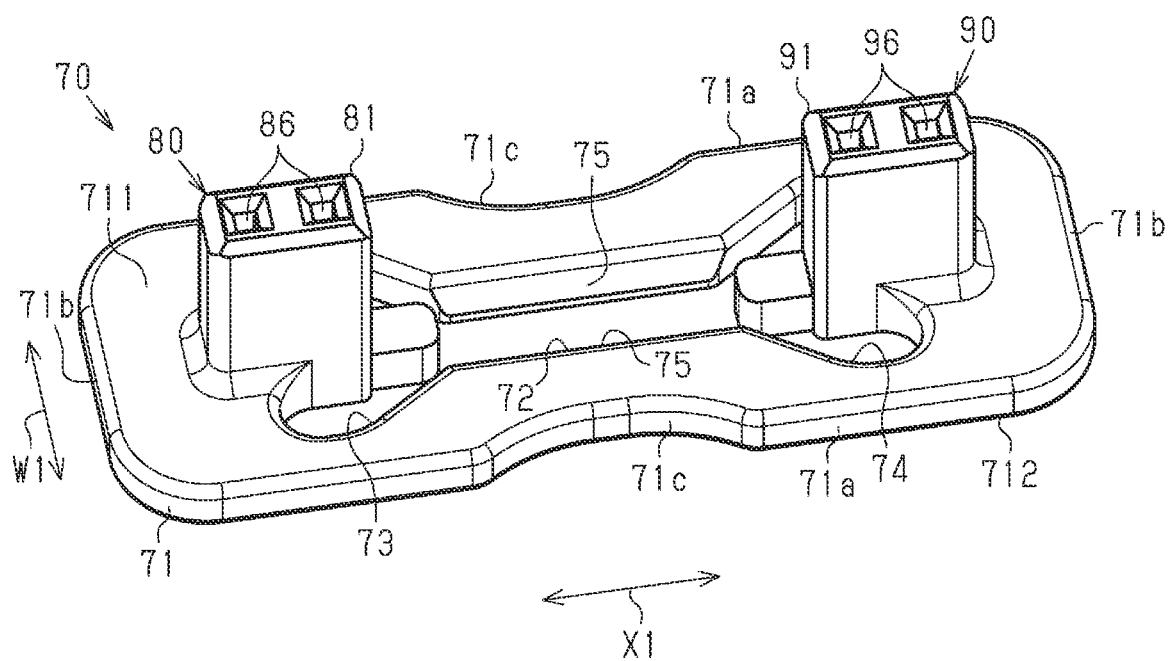
FIG. 4 is a perspective view of the connector member shown in FIG. 3.

As shown in FIGS. 3 and 4, the base portion 71 is flat. Specifically, the base portion 71 has the form of a thin plate. The base portion 71 is made of resin. The base portion 71 is rectangular in plan view of the base portion 71 in the thickness direction. The base portion 71 has a first surface 711 and a second surface 712. The first surface 711 is located at a first end of the base portion 71 in the thickness direction. The first surface 711 is flat. The second surface 712 is located at a second end of the base portion 71 in the thickness direction. The second surface 712 is flat. The first surface 711 and the second surface 712 extend in parallel with each other.

The base portion 71 includes two long side edges 71a extending in a longitudinal direction X1 of the base portion 71 and two short side edges 71b extending in a lateral direction W1 of the base portion 71. The two long side edges 71a extend in parallel with each other. The two short side edges 71b extend in parallel with each other. One of the two short side edges 71b connects the first ends of the two long side edges 71a in the longitudinal direction X1 to each other. The other one of the two short side edges 71b connects the second ends of the two long side edges 71a in the longitudinal direction X1 to each other. Each of the two long side edges 71a has a curved portion 71c. The two curved portions 71c are each curved in an arcuate shape to be recessed in a direction in which the curved portions 71c approach each other at the central part of a corresponding long side edge 71a.

Through-Hole 72

The base portion 71 has a through-hole 72. The through-hole 72 extends through the base portion 71 in the thickness direction. The through-hole 72 is located at a central part of the base portion 71. The through-hole 72 is rectangular in plan view of the base portion 71 in the thickness direction. The longitudinal direction of the through-hole 72 coincides with the longitudinal direction X1 of the base portion 71. In plan view of the base portion 71 in the thickness direction, the through-hole 72 is located between the two curved portions 71c in the lateral direction W1 of the base portion 71. Thus, each curved portion 71c is curved in an arcuate shape to be recessed from a corresponding long side edge 71a toward the through-hole 72. Since the base portion 71 has the two curved portions 71c, elastic deformation of the periphery of the through-hole 72 in the base portion 71 occurs readily in the lateral direction W1 of the base portion 71.

The base portion 71 has extension holes 73, 74. The extension hole 73 extends in the longitudinal direction X1 to be bifurcated from a first end of the through-hole 72 in its longitudinal direction. The extension hole 74 extends in the longitudinal direction X1 to be bifurcated from a second end of the through-hole 72 in its longitudinal direction. Since the base portion 71 has the two extension holes 73, 74, elastic deformation of the periphery of the through-hole 72 in the base portion 71 occurs more readily in the lateral direction W1 of the base portion 71.

First Connector Portion 80

As shown in FIG. 2, the first connector portion 80 includes a first terminal accommodating portion 81 and a first connection terminal 82. As shown in FIG. 4, the first terminal accommodating portion 81 is tubular, and protrudes from the first surface 711 of the base portion 71. The first terminal accommodating portion 81 has, for example, a square tubular shape. The first terminal accommodating portion 81 is located closer to the first end of the base portion 71 in the longitudinal direction than the through-hole 72 in the first surface 711 of the base portion 71. The first terminal accommodating portion 81 is adjacent to the through-hole 72 of the base portion 71 in the longitudinal direction in plan view of the base portion 71 in the thickness direction of the base portion 71.

As shown in FIG. 2, the first terminal accommodating portion 81 has two first terminal accommodating chambers 83. The two first terminal accommodating chambers 83 are arranged side by side in a direction orthogonal to the axial direction of the first terminal accommodating portion 81.

The two first terminal accommodating chambers 83 are divided from each other by a first partition wall 84, which is a part of the first terminal accommodating portion 81. Each first terminal accommodating chamber opens in the second surface 712 of the base portion 71 through a corresponding first terminal insertion hole 85 in the base portion 71. A tip surface of the first terminal accommodating portion 81 has two first conductive member insertion holes 86. Each first terminal accommodating chamber 83 opens in the tip surface of the first terminal accommodating portion 81 through a corresponding first conductive member insertion hole 86.

The first connector portion 80 includes two first connection terminals 82. The two first connection terminals 82 are each accommodated in a corresponding first terminal accommodating chamber 83. The first conductive member 52 inserted into the first terminal accommodating chamber 83 through the first conductive member insertion hole 86 can be inserted and connected to each first connection terminal 82. Thus, each first connection terminal 82 is accommodated in a corresponding first terminal accommodating chamber 83 such that the first conductive member 52 inserted into the first terminal accommodating chamber 83 through the first conductive member insertion hole 86 can be inserted and connected to the first connection terminal 82.

The end of each first connection terminal 82 on a side opposite to the first conductive member 52 is electrically connected to the circuit board 41 by a corresponding first terminal insertion hole 85. Thus, each first connection terminal 82 electrically connects a corresponding first conductive member 52 to the circuit board 41. Thus, the first conductive member 52 is inserted into and connected to the first connector portion 80, and the first connector portion 80 electrically connects the first conductive members 52 and the circuit board 41 to each other.

Second Connector Portion 90

The second connector portion 90 includes a second terminal accommodating portion 91 and second connection terminals 92. As shown in FIG. 4, the second terminal accommodating portion 91 is tubular, and protrudes from the first surface 711 of the base portion 71. The second terminal accommodating portion 91 has, for example, a square tubular shape. The second terminal accommodating portion 91 is located closer to the second end of the base portion 71 in the longitudinal direction than the through-hole 72 in the first surface 711 of the base portion 71. The second terminal accommodating portion 91 is adjacent to the through-hole 72 of the base portion 71 in the longitudinal direction in plan view of the base portion 71 in the thickness direction of the base portion 71.

As shown in FIG. 2, the second terminal accommodating portion 91 has two second terminal accommodating chambers 93. The two second terminal accommodating chambers 93 are arranged side by side in a direction orthogonal to the axial direction of the second terminal accommodating portion 91. The two second terminal accommodating chamber 93 are divided from each other by a second partition wall 94, which is a part of the second terminal accommodating portion 91. Each second terminal accommodating chamber opens in the second surface 712 of the base portion 71 through a corresponding second terminal insertion hole 95 in the base portion 71. A tip surface of the second terminal accommodating portion 91 has two second conductive member insertion holes 96. Each second terminal accommodating chamber 93 opens in the tip surface of the second terminal accommodating portion 91 through a corresponding second conductive member insertion hole 96.

The second connector portion 90 has two second connection terminals 92. The two second connection terminal 92 are each accommodated in a corresponding second terminal accommodating chamber 93. The second conductive member 62 inserted into the second terminal accommodating chamber 93 through the second conductive member insertion hole 96 can be inserted and connected to each second connection terminal 92. Thus, each second connection terminal 92 is accommodated in a corresponding second terminal accommodating chamber 93 such that the second conductive member 62 inserted into the second terminal accommodating chamber 93 through the second conductive member insertion hole 96 can be inserted and connected to the second connection terminal 92.

The end of each second connection terminal 92 on a side opposite to the second conductive member 62 is electrically connected to the circuit board 41 by a corresponding second terminal insertion hole 95. Thus, each second connection terminal 92 electrically connects a corresponding second conductive member 62 to the circuit board 41. Thus, the second conductive member 62 is inserted into and connected to the second connector portion 90, and the second connector portion 90 electrically connects the second conductive member 62 and the circuit board 41 to each other.

Attachment Wall Portion 42

Figure 5:
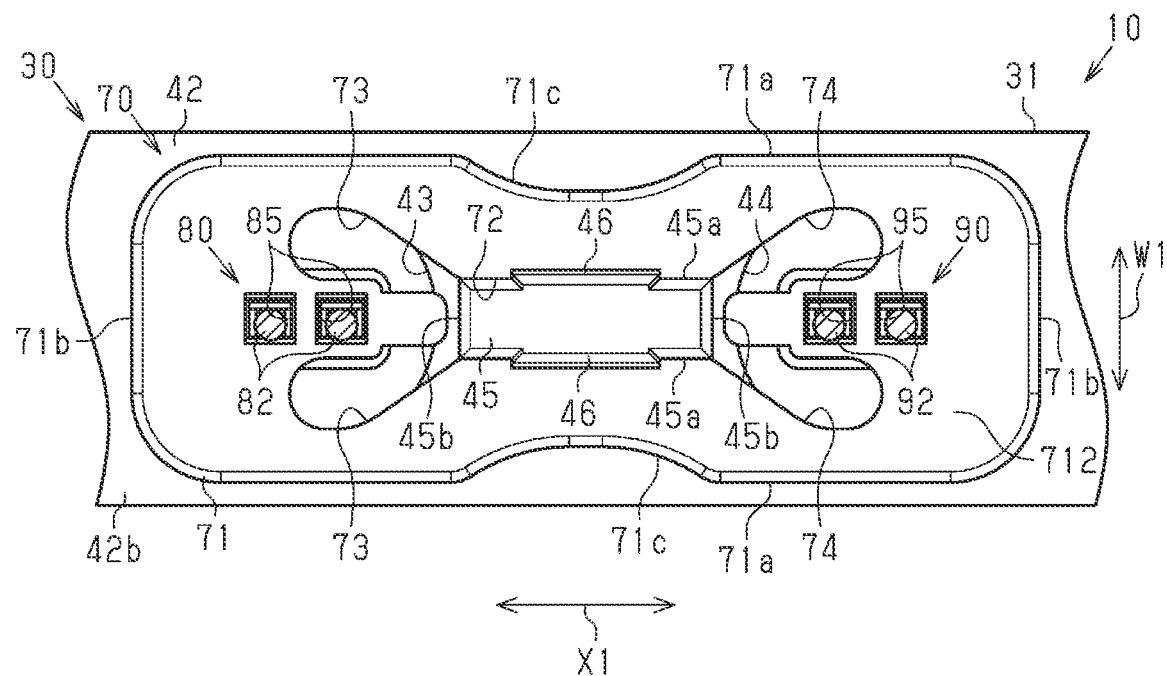
FIG. 5 is a cross-sectional view showing a state in which the connector member of FIG. 3 is attached to the base.

As shown in FIGS. 2 and 5, the base 30 includes an attachment wall portion 42. The connector member 70 is attached to the attachment wall portion 42. The attachment wall portion 42 faces the first pilot solenoid valve 50 and the second pilot solenoid valve 60. The attachment wall portion 42 has an outer surface 42a and an inner surface 42b. The outer surface 42a of the attachment wall portion 42 faces the first pilot solenoid valve 50 and the second pilot solenoid valve 60. The inner surface 42b of the attachment wall portion 42 is a surface which is opposite to the outer surface 42a and to which the connector member 70 is attached.

First Connection Port 43

As shown in FIG. 2, the base 30 has a first connection port 43. The first connection port 43 extends through the attachment wall portion 42. The first terminal accommodating portion 81 is disposed in the first connection port 43. Thus, the first connector portion 80 is disposed in the first connection port 43. The first tubular portion 53 is inserted into the first connection port 43. In this state, the first terminal accommodating portion 81 is inserted into the first tubular portion 53. Accordingly, the first pilot solenoid valve 50 includes the first tubular portion 53, into which the first connector portion 80 is inserted. A first lip packing 54 is disposed between the outer circumferential surface of the first tubular portion 53 and the inner circumferential surface of the first connection port 43. The first lip packing 54 seals a section between the first tubular portion 53 and the first connection port 43.

Second Connection Port 44

The base 30 has a second connection port 44. The second connection port 44 extends through the attachment wall portion 42. The second terminal accommodating portion 91 is disposed in the second connection port 44. Thus, the second connector portion 90 is disposed in the second connection port 44. The second tubular portion 63 is inserted into the second connection port 44. In this state, the second terminal accommodating portion 91 is inserted into the second tubular portion 63. Accordingly, the second pilot solenoid valve 60 includes the second tubular portion 63 into which the second connector portion 90 is inserted. A second lip packing 64 is disposed between the outer circumferential surface of the second tubular portion 63 and the inner circumferential surface of the second connection port 44. The second lip packing 64 seals a section between the second tubular portion 63 and the second connection port 44.

Insertion Direction Z1

When the first tubular portion 53 is inserted into the first connection port 43, each first conductive member 52 is inserted into a corresponding first terminal accommodating chamber 83 through the first conductive member insertion hole 86, and is inserted into and connected to the first connection terminal 82. In this manner, each first conductive member 52 is inserted into and connected to the first connector portion 80. Further, when the second tubular portion 63 is inserted into the second connection port 44, each second conductive member 62 is inserted into the second terminal accommodating chamber 93 through the second conductive member insertion hole 96, and is inserted and connected to the second connection terminal 92. In this manner, each second conductive member 62 is inserted into and connected to the second connector portion 90.

The insertion direction of the first conductive members 52 into the first connector portion 80 is identical with the insertion direction of the second conductive members 62 into the second connector portion 90. In the following description, the insertion direction of the first conductive members 52 into the first connector portion 80 and the insertion direction of the second conductive members 62 into the second connector portion 90 may be simply referred to as an insertion direction Z1.

Protrusion 45

The base 30 includes a protrusion 45. The protrusion 45 is columnar. The protrusion 45 protrudes from the attachment wall portion 42. As shown in FIG. 5, the protrusion 45 is rectangular in plan view of the base portion 71 in the thickness direction. The protrusion 45 has two long side surfaces 45a extending in the longitudinal direction of the protrusion 45 and two short side surfaces 45b extending in the lateral direction of the protrusion 45. The two long side surfaces 45a extend in parallel with each other. The two short side surfaces 45b extend in parallel with each other. One of the two short side surfaces 45b connects first ends of the two long side surfaces 45a in the longitudinal direction to each other. The other one of the two short side surfaces 45b connects the second ends of the two long side surfaces 45a in the longitudinal direction to each other.

Engagement Projection 46

The base 30 includes two engagement projections 46. The two engagement projections 46 protrude from the two long side surfaces 45a of the protrusion 45, respectively. Thus, the two long side surfaces 45a are two side surfaces of the protrusion 45 from which the two engagement projections 46 protrude, respectively.

Figure 6:
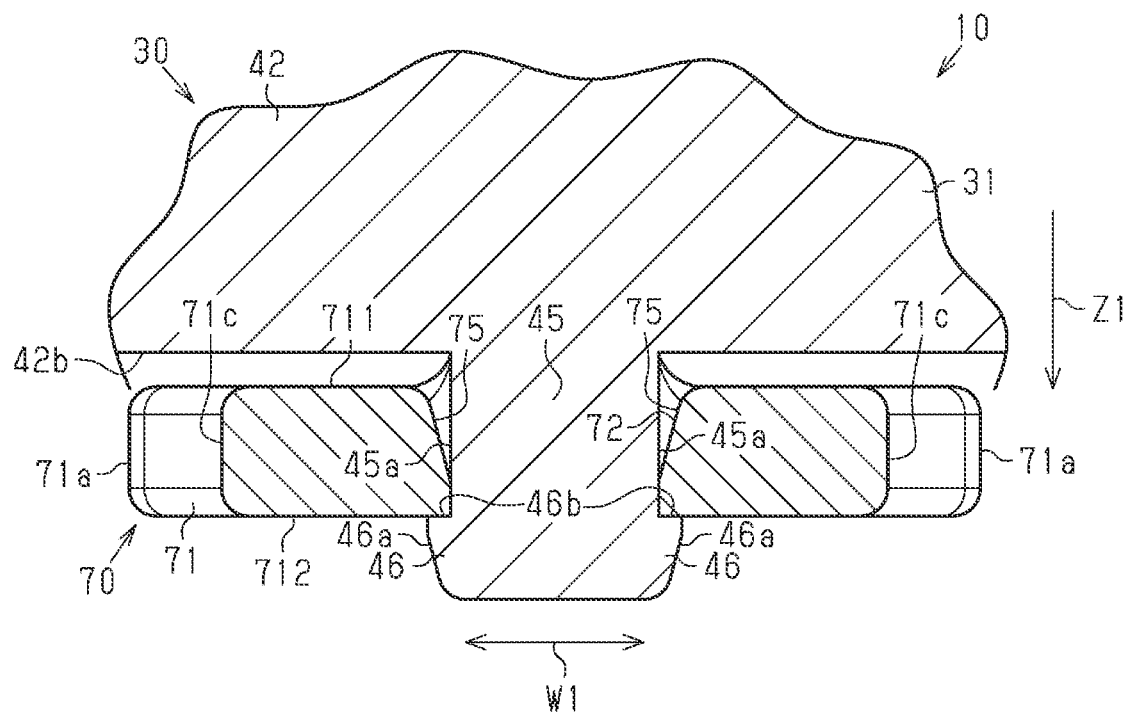
FIG. 6 is a cross-sectional view showing a state in which the connector member of FIG. 3 is attached to the base.

As shown in FIG. 6, the two engagement projections 46 respectively include side surfaces 46a. The side surfaces 46a are inclined to extend away from each other as extending away from the tip of the protrusion 45. Each engagement projection 46 has a step surface 46b. Each step surface 46b connects a corresponding long side surface 45a of the protrusion 45 to an end edge of the side surface 46a of the engagement projection 46 on the side opposite to the tip of the protrusion 45. The step surfaces 46b are orthogonal to the long side surfaces 45a of the protrusion 45. A part of the base portion 71 around the through-hole 72 is engageable with the two engagement projections 46. The first surface 711 of the base portion 71 faces the inner surface 42b of the attachment wall portion 42.

Guide Surface 75

The through-hole 72 has two guide surfaces 75. When the two engagement projections 46 are inserted into the through-hole 72, the two guide surfaces 75 are each guided by the side surface 46a of a corresponding engagement projection 46. The two guide surfaces 75 are inclined to approach each other as extending away from the first surface 711, which is a surface of the base portion 71 facing the attachment wall portion 42.

Relationship Between Connector Member 70 and Base 30

As shown in FIGS. 5 and 6, the connector member 70 is disposed relative to the base 30 such that the two engagement projections 46 are inserted into the through-hole 72 with the longitudinal direction of the through-hole 72 coinciding with the longitudinal direction of the protrusion 45. In this state, the thickness direction of the base portion 71 coincides with the insertion direction Z1. The base portion 71 is elastically deformable in a direction intersecting the insertion direction Z1 when the two engagement projections 46 are inserted into the through-hole 72. Specifically, when the two engagement projections 46 are inserted into the through-hole 72, elastic deformation of the part of the base portion 71 around the through-hole 72 readily occurs in the lateral direction W1 of the base portion 71.

When the two engagement projections 46 pass through the through-hole 72, the part of the base portion 71 around the through-hole 72 returns to its original shape prior to the elastic deformation. Then, the part of the base portion 71 around the through-hole 72 engages with the step surfaces 46b of the two engagement projections 46. When the part of the base portion 71 around the through-hole 72 engages with the two engagement projections 46 in this manner, the connector member 70 is attached to the base 30. In a state in which the connector member 70 is attached to the base 30, the connector member 70 is allowed to slightly move in each of the longitudinal direction X1 of the base portion 71 and the lateral direction W1 of the base portion 71.

Operation of Embodiment

The operation of the present embodiment will now be described.

The connector member 70, which is formed by integrating the base portion 71 with the first connector portion 80 and the second connector portion 90, is attached to the base 30. Thus, the relative position between the first connector portion 80 and the second connector portion 90 does not deviate from a predetermined position. This allows the first conductive members 52 and the second conductive members 62 to be readily inserted into and connected to the first connector portion 80 and the second connector portion 90, respectively.

For example, when a voltage is applied to the first solenoid portion 51 from the circuit board 41 and a voltage is not applied to the second solenoid portion 61 from the circuit board 41, the spool valve 18 is switched to the first position. When the spool valve 18 is switched to the first position, the fluid supplied to the supply port P is output to the fluid pressure device through the first output port A and the first output passage 33. Then, the pressurized fluid from the fluid pressure device is discharged out of the second discharge passage 36 through the second output passage 34, the second output port B, and the second discharge port R2.

In contrast, as shown in FIG. 1, when a voltage is not applied to the first solenoid portion 51 from the circuit board 41 and a voltage is applied to the second solenoid portion 61 from the circuit board 41, the spool valve 18 is switched to the second position. When the spool valve 18 is switched to the second position, the fluid supplied to the supply port P is output to the fluid pressure device through the second output port B and the second output passage 34. Then, the pressurized fluid from the fluid pressure device is discharged out of the first discharge passage 35 through the first output passage 33, the first output port A, and the first discharge port R1.

Advantages of Embodiment

The above embodiment provides the following advantages.

(1) The connector member 70, which is formed by integrating the flat base portion 71 with the first connector portion 80 and the second connector portion 90, is attached to the base 30. In this configuration, the relative position between the first connector portion 80 and the second connector portion 90 does not deviate from a predetermined position. This allows the first conductive members 52 and the second conductive members 62 to be readily inserted into and connected to the first connector portion 80 and the second connector portion 90, respectively.

Furthermore, when the two engagement projections 46 are inserted into the through-hole 72, the base portion 71 is elastically deformable in the direction intersecting the direction in which the first conductive member 52 and the second conductive member 62 are inserted into the first connector portion 80 and the second connector portion 90, respectively. Thus, to attach the connector member 70 to the base 30, for example, the connector member 70 does not need to have an elongated plate-shaped engagement projection that is engageable with a recess of the base 30.

For example, if the connector member 70 includes an elongated plate-shaped engagement projection, the engagement projection needs to be elastically deformed. Thus, the engagement projection needs to have a certain length. This necessitates the arrangement of a space for disposing the engagement projection, and accordingly increases the size of the solenoid valve manifold 10. However, the connector member 70 of the present embodiment is attached to the base 30 when the part of the base portion 71 around the through-hole 72 engages with the two engagement projections 46. Thus, since the connector member 70 can be attached to the base 30 without arranging an elongated plate-shaped engagement projection on the connector member 70, the size of the solenoid valve manifold 10 is reduced. The above configuration allows the first conductive members 52 and the second conductive members 62 to be readily inserted into and connected to the first connector portion 80 and the second connector portion 90, respectively. Additionally, the configuration reduces the size of the solenoid valve manifold 10.

(2) The two engagement projections 46 respectively include the side surfaces 46a, which are inclined to extend away from each other as extending away from the tip of the protrusion 45. The two guide surfaces 75 of the through-hole 72 are inclined to approach each other as extending away from the surface of the base portion 71 facing the attachment wall portion 42. In this configuration, when the two engagement projections 46 are inserted into the through-hole 72, each guide surface 75 of the through-hole 72 is guided by the side surface 46a of a corresponding engagement projection 46. This facilitates insertion of the two engagement projections 46 into the through-hole 72, and thus allows the connector member 70 to be readily attached to the base 30.

(3) The first lip packing 54, which is made of rubber and seals the section between the first tubular portion 53 and the first connection port 43, is disposed between the outer circumferential surface of the first tubular portion 53 and the inner circumferential surface of the first connection port 43. The second lip packing 64, which is made of rubber and seals the section between the second tubular portion 63 and the second connection port 44, is disposed between the outer circumferential surface of the second tubular portion 63 and the inner circumferential surface of the second connection port 44. In this configuration, the dimensional tolerance between the base 30 and each of the first and second pilot solenoid valves 50, 60 is absorbed by the elastic deformation of the first lip packing 54 and the second lip packing 64. This allows the first conductive members 52 and the second conductive members 62 to be more readily inserted into and connected to the first connector portion 80 and the second connector portion 90, respectively.

Modifications

The above embodiment may be modified as follows. The above embodiment and the following modifications can be combined as long as the combined modifications remain technically consistent with each other.

In the embodiment, the two engagement projections 46 do not have to respectively protrude from the two long side surfaces 45a of the protrusion 45. Instead, for example, the two engagement projections 46 may respectively protrude from the two short side surfaces 45b of the protrusion 45. In this case, when the two engagement projections 46 are inserted into the through-hole 72, elastic deformation of the part of the base portion 71 around the through-hole 72 occurs in the longitudinal direction X1 of the base portion 71. In short, the base portion 71 only needs to be configured such that the part of the base portion 71 around the through-hole 72 is elastically deformable in the direction intersecting the insertion direction Z1 when the two engagement projections 46 are inserted into the through-hole 72. The connector member 70 only needs to be attached to the base 30 when the part of the base portion 71 around the through-hole 72 engages with the two engagement projections 46.

In the embodiment, the side surfaces 46a of the two engagement projections 46 do not have to be inclined to extend away from each other as extending away from the tip of the protrusion 45. For example, the side surfaces 46a of the two engagement projections 46 may be flat surfaces extending in the same direction as the protruding direction of the protrusion 45 from the attachment wall portion 42. In this case, the two guide surfaces 75 of the through-hole 72 does not have to be inclined to approach each other as extending away from the surface of the base portion 71 facing the attachment wall portion 42. For example, the two guide surfaces 75 of the through-hole 72 may be flat surfaces extending in the same direction as the thickness direction of the base portion 71.

In the embodiment, an annular gasket may be disposed between the base 30 and each of the first pilot solenoid valve 50 and the second pilot solenoid valve 60. The gasket may seal the section between the base 30 and each of the first pilot solenoid valve 50 and the second pilot solenoid valve 60. In this case, the solenoid valve manifold 10 does not have to include the first lip packing 54 or the second lip packing 64.

In the embodiment, the number of first conductive members 52 is not particularly limited.

In the embodiment, the number of second conductive members 62 is not particularly limited.

In the embodiment, the first pilot solenoid valve 50 does not have to include the first tubular portion 53.

In the embodiment, the second pilot solenoid valve 60 does not have to include the second tubular portion 63.

In the embodiment, the base portion 71 does not have to include the extension holes 73, 74.

In the embodiment, the shape of the protrusion 45 is not particularly limited. The shape of the through-hole 72 may be changed depending on the shape of the protrusion 45.

In the embodiment, the solenoid valve 11 may be, for example, a four-port solenoid valve that does not include the second discharge port R2. In short, the solenoid valve 11 only needs to have at least one discharge port. Alternatively, the solenoid valve 11 may be a three-port solenoid valve that has a supply port, an output port, and a discharge port.

The term "annular" as used in this description may refer to any structure that forms a loop, or a continuous shape with no ends, as well as a generally loop-shaped structure with a gap, such as a C-shape. "Annular" shapes include but are not limited to a circular shape, an elliptic shape, and a polygonal shape with sharp or rounded corners. Likewise, "tubular" shapes include but are not limited to any structure having a circular cross-sectional shape, an elliptic cross-sectional shape, and a polygonal cross-sectional shape with sharp or rounded corners.

The invention claimed is:

1. A solenoid valve manifold, comprising:
a main valve portion including a first pilot pressure acting chamber and a second pilot pressure acting chamber, the main valve portion being configured to switch connected ports when a pilot fluid is supplied to and discharged from each of the first pilot pressure acting chamber and the second pilot pressure acting chamber;
a first pilot solenoid valve including a first solenoid portion and configured to supply and discharge the pilot fluid to and from the first pilot pressure acting chamber;
a second pilot solenoid valve including a second solenoid portion and configured to supply and discharge the pilot fluid to and from the second pilot pressure acting chamber;
a control unit including a circuit board that is configured to control driving of the first pilot solenoid valve and the second pilot solenoid valve; and
a base including the control unit, wherein
the first pilot solenoid valve and the second pilot solenoid valve are integrated with each other and arranged side by side,
the first pilot solenoid valve includes a first conductive member electrically connected to the first solenoid portion,
the second pilot solenoid valve includes a second conductive member electrically connected to the second solenoid portion,
the base includes:
a first connector portion into which the first conductive member is inserted and connected, the first connector portion being configured to electrically connect the first conductive member to the circuit board; and
a second connector portion into which the second conductive member is inserted and connected, the second connector portion being configured to electrically connect the second conductive member to the circuit board,
an insertion direction of the first conductive member into the first connector portion is identical with an insertion direction of the second conductive member into the second connector portion,
the solenoid valve manifold further comprises a connector member having a flat base portion, the first connector portion and the second connector portion being integrated with the base portion,
the base portion has a through-hole extending through the base portion in a thickness direction,
the base includes two engagement projections,
the base portion is elastically deformable in a direction intersecting the insertion direction when the two engagement projections are inserted into the through-hole, and
the connector member is configured to be attached to the base when a part of the base portion around the through-hole is engaged with the two engagement projections.

2. The solenoid valve manifold according to claim 1, wherein
the base includes:
an attachment wall portion to which the connector member is attached; and
a columnar protrusion that protrudes from the attachment wall portion,
the two engagement projections respectively protrude from two side surfaces of the protrusion,
the two engagement projections respectively include side surfaces, the side surfaces being inclined to extend away from each other as extending away from a tip of the protrusion,
the through-hole has two guide surfaces that are respectively guided by the side surfaces of the two engagement projections when the two engagement projections are inserted into the through-hole, and
the two guide surfaces are inclined to approach each other as extending away from a surface of the base portion facing the attachment wall portion.

3. The solenoid valve manifold according to claim 1, wherein
the first pilot solenoid valve includes a first tubular portion which surrounds the first conductive member and into which the first connector portion is inserted,
the second pilot solenoid valve includes a second tubular portion which surrounds the second conductive member and into which the second connector portion is inserted,
the base includes:
a first connection port in which the first connector portion is disposed and into which the first tubular portion is inserted; and
a second connection port in which the second connector portion is disposed and into which the second tubular portion is inserted,
a first lip packing made of rubber and configured to seal a section between the first tubular portion and the first connection port is disposed between an outer circumferential surface of the first tubular portion and an inner circumferential surface of the first connection port, and
a second lip packing made of rubber and configured to seal a section between the second tubular portion and the second connection port is disposed between an outer circumferential surface of the second tubular portion and an inner circumferential surface of the second connection port.

* * * * *